Jan. 12, 1926.

E. S. CLARK 1,569,264

KITCHEN UTENSIL

Filed August 1, 1925

Inventor
E. S. Clark
By C. A. Snow & Co.
Attorneys.

Patented Jan. 12, 1926.

1,569,264

UNITED STATES PATENT OFFICE.

ERNESTINE S. CLARK, OF SAN ANTONIO, TEXAS.

KITCHEN UTENSIL.

Application filed August 1, 1925. Serial No. 47,573.

*To all whom it may concern:*

Be it known that I, Miss ERNESTINE S. CLARK, a citizen of the United States, residing at San Antonio, in the county of Bexar and State of Texas, have invented a new and useful Kitchen Utensil, of which the following is a specification.

This invention relates to kitchen utensils and more particularly to devices for flouring meats, vegetables and the like.

The object of the invention is to provide a simple device of this character in which the articles to be floured may be placed and thoroughly covered with flour without any being wasted and without it being scattered around.

Another object of the invention is to provide a device of this character which avoids the necessity of handling of the meats and vegetables after they have been floured and which is so constructed that each piece will be separated and thoroughly exposed to the flouring operation.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
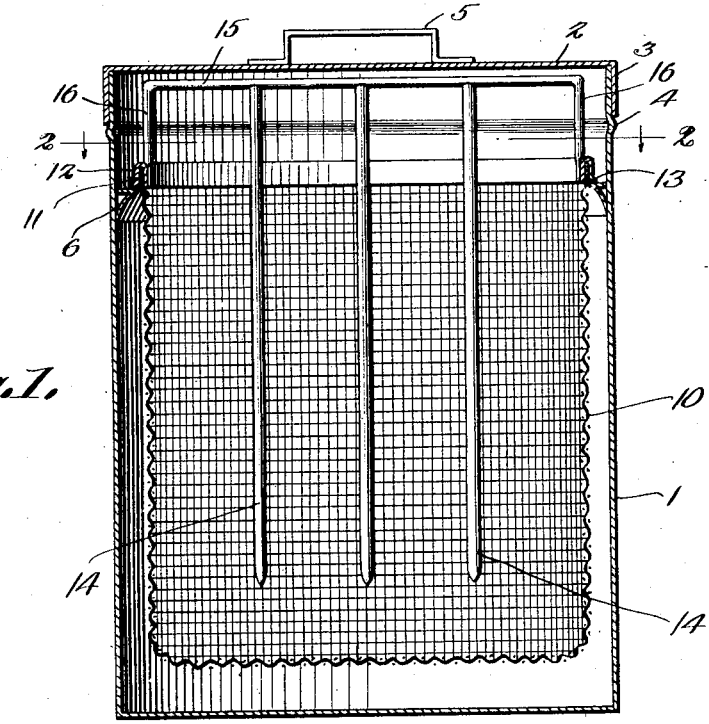
Figure 2:
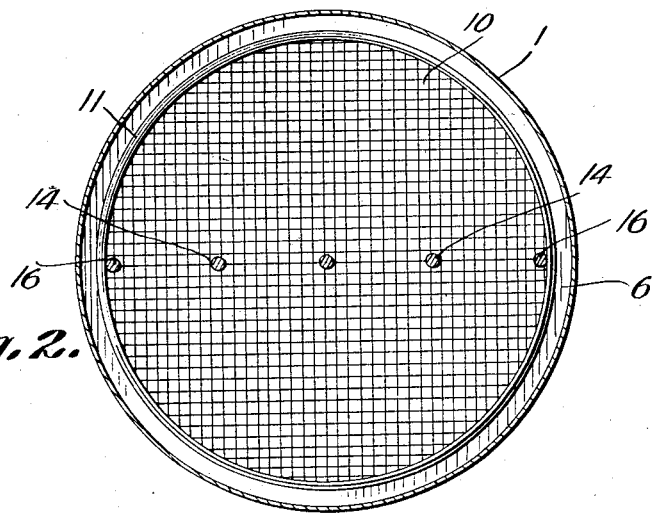

Figure 1 represents a vertical section of a utensil constructed in accordance with this invention; and Figure 2 is a horizontal section taken on the line 2—2 of Figure 1.

This utensil which is designed for flouring chicken, steak, chops, vegetables and the like comprises an outer container or casing 1 having a removable top 2 with a flange 3 fitting down over the top of the container 1 and preferably resting on a bead 4 formed in the upper end of the casing.

This top 2 is also equipped with a handle 5 to facilitate its application and removal.

Located in the upper portion of the can or container 1 is an annular basket support 6 here shown made in the form of a shelf suitably supported and connected with the can and which is designed to support a screen wire basket or sifter 10 which is equipped at its upper end with a metal collar 11 here shown in the form of a metal strip folded and straddling the upper edge of the wire basket and secured thereto by soldering or otherwise. The outer member or flange 12 of this band is preferably provided at its free edge with a laterally extending lip 13 which when the basket 10 is inserted in the container is designed to rest on the shaft 6 and support the basket with its bottom spaced from the bottom of the container and with its side walls thereof spaced from the container walls. This basket 10 is designed for containing the food to be floured and has mounted therein a plurality of tines 14, any desired number of which may be employed, three being here shown. These tines 14 depend from a crossbar 15 which projects above the upper end of the basket 10 and is secured to the band 11 thereof by downwardly extending arms 16 which are riveted or otherwise secured to said band and securely hold the tines in operative position within the basket. These tines 14 are designed as separators or agitators to prevent the articles to be floured from becoming matted in the basket so that when the container is shaken to effect the flouring operation these tines will keep the material or objects being floured separated. The cross bar 15 and arms 16 are preferably housed in the upper portion of the container above the shelf 6 as is shown clearly in Fig. 1 and which forms a hand grip for lifting the basket to and from the container.

The cross bar 15 being located adjacent the top 2 of the container will operate to hold the basket in position on the ledge or shelf 6 when the can is shaken and prevent dislocation of the basket.

After the basket has been removed from the container 1 the flour remaining in the container will be sifted and cleaned ready for the next operation so that when the basket is replaced the flour will pass back into the basket on shaking of the container and operate to flour any other articles which may be inserted in the basket.

It is of course understood that the container 1 may be finished in any suitable manner being enameled or not according to the wishes of the manufacturer.

I claim:—

1. A utensil of the class described comprising an imperforate container, having a removable top, with an annular support located near the upper end on its inner face, a foraminous basket having a reinforcing band at its upper end provided with a laterally extending annular lip to rest on said shelf, a plurality of tines extending into said basket and secured in fixed relation thereto to operate as separators for the food to be floured.

2. A utensil of the class described comprising an imperforate container, having a removable top, with an annular support located near the upper end on its inner face, a foraminous basket having a reinforcing band at its upper end provided with a laterally extending annular lip to rest on said shelf, a plurality of tines extending into said basket and secured in fixed relation thereto to operate as separators for the food to be floured, a cross bar connecting said tines and fixed to said reinforcing band, said cross bar being located in the upper portion of the container in position to be held against vertical movement by the top of the container.

In testimony that I claim the foregoing as my own, I have hereto affixed my signature.

Miss ERNESTINE S. CLARK.